Aug. 5, 1930. G. P. LUCKEY 1,772,152
IMPULSE TACHOMETER
Filed Nov. 8, 1923
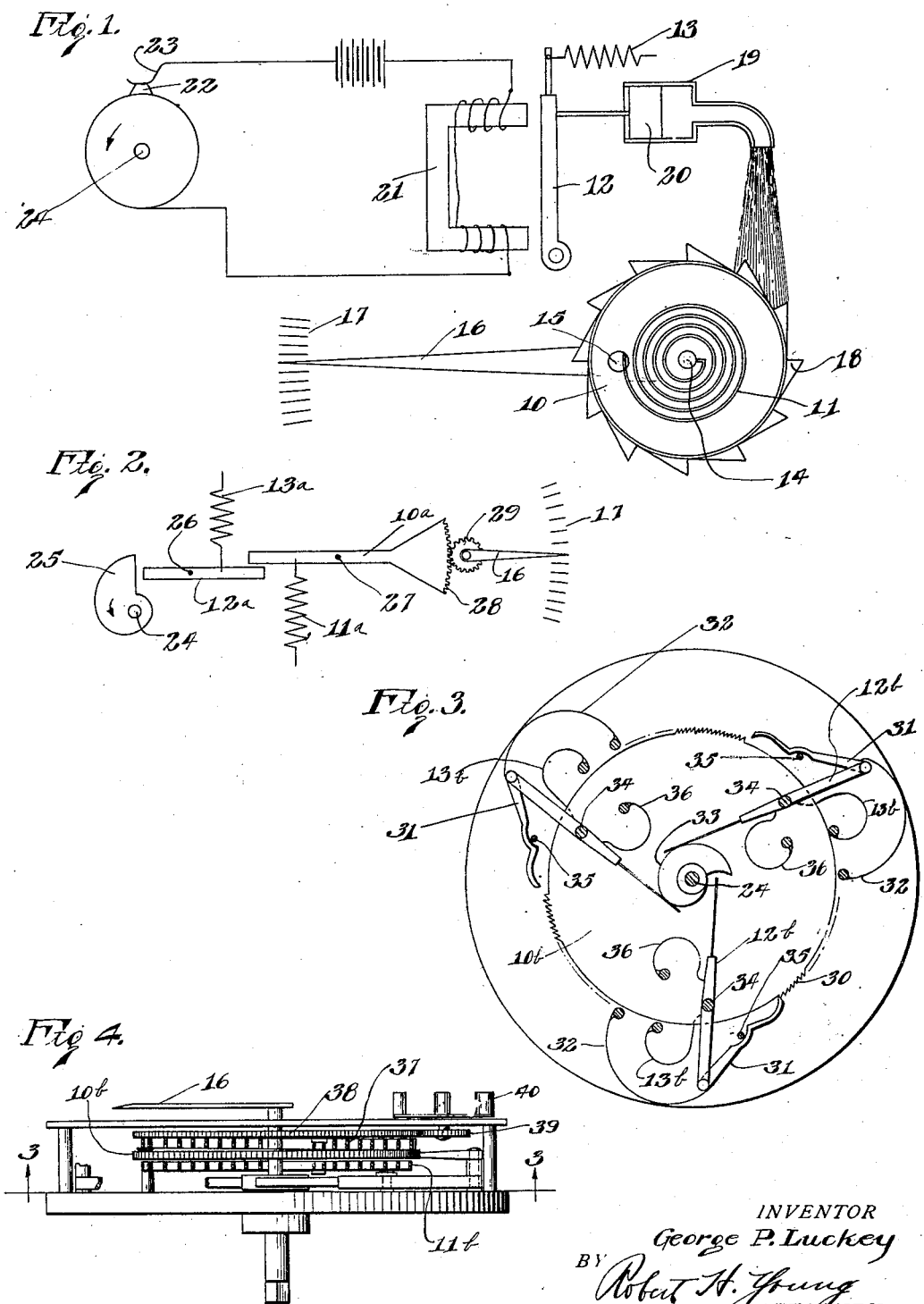
INVENTOR
George P. Luckey
BY Robert H. Young
ATTORNEY Patented Aug. 5, 1930

1,772,152

UNITED STATES PATENT OFFICE

GEORGE P. LUCKEY, OF DAYTON, OHIO

IMPULSE TACHOMETER

Application filed November 8, 1923. Serial No. 673,529.

This invention relates to a tachometer and has for its principal object to provide an accurate device for measuring the speed of rotation, vibration, reciprocation or other movement, of a device.

The invention is capable of embodiment in a variety of forms, as will be apparent from the following description, but essentially comprises a movable body constrained by a spring or the like, the force of which becomes greater as the body is moved from its initial or zero position, struck or otherwise acted upon by uniform impulses or impacts proportional or equal in number to the revolutions or other movements per unit of time of the device whose speed is to be measured.

The invention is illustrated as embodied in a few alternative structures in the accompanying drawing, wherein Fig. 1 is a diagrammatic illustration of a tachometer operating with uniform air impulses.

Fig. 2 is a similar view showing a tachometer operating with direct impacts.

Fig. 3 is a view of another tachometer operating with impacts delivered tangentially to a rotatable member a number of times per revolution of a shaft whose speed is to be determined. This view is a section taken on the line 3—3 of Fig. 4.

Fig. 4 is a plan view of the tachometer shown in part in Fig. 3.

Throughout the views the same or similar reference numerals are applied to corresponding parts.

The tachometer of my invention, as above stated, comprises essentially a movable body or inertia member 10 constrained by a spring 11 and acted upon by impulses from an impulse or comparison inertia member 12, the extent of movements of which are designed to be constant in degree and proportional in number to the movements of the device whose speed is to be measured and to transmit uniform impulses because of the uniform deflection of the spring 13. The four elements just mentioned are essential to the operation of my invention and may be embodied in different ways in different forms of devices to secure the same result. In the present device, the member 10 is a disk rotatable on a spindle 14 and having one end of the spring 11 attached thereon as at 15 and the other end attached to the spindle. The disk 10 has a dial hand or index needle 16 movable therewith relative to a scale 17 marked with suitable indicia, as revolutions per minute, although of course the measurement of movements generally other than revolutions is contemplated. The disk 10 has vanes or paddle projections 18 on the periphery thereof against which blasts or currents of air from a pump 19 are directed in the operation of the tachometer. The blasts of air are caused by the reciprocation of the piston 20 of the pump in the oscillation of the impulse member 12, which in the present device is an armature for an electromagnet 21. The armature is obviously capable of only a certain fixed amount of movement and, upon the energization of the electromagnet by the closing of contacts 22 and 23 once per revolution of the shaft 24, is arranged to be attracted to the electro-magnet against the tension of the spring 13. Upon the opening of the contacts, the armature 12 is retracted by the spring 13 and an air impulse is thereby transmitted because of the coincident movement of the piston 20. The impulses thus transmitted are uniform in character because of the uniform deflections of the spring 13. Variation in the speed of the shaft 24, which is of course the device whose speed is to be determined in this case, causes a corresponding variation in the frequency with which the impulses are transmitted by the pump 19 to the disk 10. The spring 11 of the disk 10 in the deflections of the needle 16 exerts increasing resistance to further deflection the more the disk is deflected and the tendency is to balance the force of the impulses causing the deflection of the disk. It is in this way that the variations in speeed of the shaft 24 are reflected in movements of the needle 16 to different points of the scale 17. It is apparent that the number of impulses delivered to the disk 10 may, instead of being equal in number to the revolutions of the shaft 24, be greater or less but proportionate to the number of revolutions of the shaft without affecting the ultimate result, so long as the scale 17 is calibrated accordingly.

In the alternative form shown in Fig. 2, the revolutions of the shaft 24 are measured by the number of impacts delivered to the index or inertia member 10a by the impact or impulse rocker arm 12a. The spring 13a is deflected constant degrees by a comparison inertia member such as the cam 25 in the rotation of the shaft 24. When the rocker arm 12a rides off the peak of the cam, it swings on its pivot 26 under the tension of the spring and its outer end strikes the free end of the index member 10a with a certain force, causing the same to swing on its pivot 27 and thereby deflect the needle 16 relative to the scale 17. The index member 10a is in this case a rocker arm, the one end of which has a sector gear 28 meshing with a pinion 29 carrying the needle 16. Variations in the speed of the shaft 24 cause corresponding variations in the frequency with which the impulses are transmitted to the index member 10a. The spring 11a of the index member 10a, in the deflection of the needle 16, exerts decreasing resistance to further deflection the more the index member is deflected and in this way measures the force produced by the succession of uniform impulses of the spring 13a, thereby giving the relationship with the speed variations of the shaft 24 which causes the deflections of the spring a number of times proportionately with the number of its revolutions.

In Figs. 3 and 4 a third alternative form of the invention is shown in which a disk 10b having ratchet teeth or other friction-increasing projections 30 on its periphery, is arranged to be impelled against the action of a spring 11b by a series of three rocker arm impulse members 12b having pawls 31 pivotally connected to their outer free ends and arranged to move in and engage the ratchet teeth 30 under the action of springs 32 when the rocker arms 12b are actuated. The actuating means in this case comprises a cam 33 centrally arranged relative to the rocker arms 12b and carried by the shaft 24 whose speed is to be measured. The rocker arms are moved in succession on their pivots 34 by the cam 33 against the tension of the springs 13b, each to the same extent and are arranged when their free ends ride off the peak of the cam to swing inwardly under the action of the springs 13b thereby moving the pawls 31 forward so they ride off spacing pins 35 into contact with the periphery of the disk and expend the energy stored up in the springs 13b by impelling the disk 10b forwardly. The pawls 31 after delivering their impulses, are each arranged to move clear of the periphery of the disk by riding on the pins 35. This is to avoid their acting as a drag on the disk 10b and causing inaccuracy in the instrument. The inner ends of the rocker arms 12b are normally free of the dip in the cam 33 as shown so that the arms in operation are free to swing on their pivots under their momentum and will not be limited by their inner ends coming into contact with the cam 33. The springs 36 serve to cushion the swinging of the rocker arms and to tend to maintain their normal relation to the cam. The advantage in delivering a number of impulses per revolution of the shaft from which to measure the speed of the shaft is that a greater constancy of the needle 16 is thereby assured and the possibilities of lack of uniformity of impulses affecting the accuracy are minimized. A further means utilized as a step in the same direction is the dampening means appearing in Fig. 4 consisting of a coiled spring 37 having one end attached to the disk 10b and its other end attached to a gear 38 meshed with a pinion 39 carrying on its spindle a vaned disk 40. Other suitable and greater dampening means may of course be provided if desired.

I claim:

1. In a speed measuring instrument, in combination a dial-hand operating member, spring means restraining said member in its movement, impact means mounted adjacent to said member to deliver impacts to said member, a spring acting on said impact device to hold the same with a constant force and cause a constant impact force regardless of the speed means acting on said impact device to periodically actuate and release the spring, dependent upon the speed of the element whose speed is to be measured and adapted to be operated for instantaneously releasing said impact device to permit the spring to act for the purpose described.

2. In a speed measuring instrument, in combination a dial-hand operating plate, springs means restraining said plate in its movement, an impact lever mounted adjacent to said plate to deliver impacts thereto, a spring acting on said impact lever to hold the same with a constant force and cause a constant impact force regardless of the speed, a spring actuating cam acting on said impact lever periodically to actuate the spring, dependent on the speed of the element whose speed is to be measured, said cam having an abrupt depression for instantaneously releasing said impact lever to permit the spring to act for the purpose described.

3. In a speed measuring instrument, the combination of a rotatable dial-hand operating plate provided with a series of teeth on its periphery, spiral spring means restraining said plate in its movement, a plurality of impact levers pivoted adjacent said plate, a pawl pivoted to each lever adapted to deliver impacts to the edge of said plate, a spring acting on each of said impact levers to move the same with constant force, a cam successively acting on said impact levers to periodically tension the springs, dependent on the speed of the element whose speed is to be measured, said cam having an abrupt depression for instantaneously releasing said impact levers to permit the spring to act for the purpose described.

4. An apparatus for the measurement of speed embodying an inertia member, indicating means operatively connected with said inertia member, an impulse element mounted to oscillate at a speed not proportional to the speed to be measured and adapted to engage with and move said first mentioned inertia member and means operable at a speed proportional to the speed to be measured for intermittent engagement with said impulse element.

5. An apparatus for the measurement of speed embodying a spring operated inertia member, indicating means operatively connected with said inertia member, an impulse element mounted to oscillate at a speed not proportional to the speed to be measured and adapted to engage with and move said first mentioned inertia member and an involute cam operable at a speed proportional to the speed to be measured for intermittent engagement with said impulse element.

6. An apparatus for the measurement of speed embodying an impulse member, means for impelling the impulse member, an involute cam adapted to be rotated at a speed proportional to the speed to be measured and co-acting with the impulse member for opposing the force of the impelling means and retracting the impulse member, said cam being adapted through its rotation to periodically release the impulse member for movement by the impelling means, indicating means, and an inertia member co-acting with said impulse member and adapted to operate said indicating means.

In testimony whereof I affix my signature.

GEORGE P. LUCKEY.